(12) United States Patent
Sato

(10) Patent No.: US 12,715,249 B2
(45) Date of Patent: Aug. 25, 2026

(54) PNEUMATIC TIRE

(71) Applicant: The Yokohama Rubber Co., LTD., Tokyo (JP)

(72) Inventor: Shun Sato, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 392 days.

(21) Appl. No.: 17/050,408

(22) PCT Filed: Apr. 11, 2019

(86) PCT No.: PCT/JP2019/015720
§ 371 (c)(1),
(2) Date: Oct. 23, 2020

(87) PCT Pub. No.: WO2019/208230
PCT Pub. Date: Oct. 31, 2019

(65) Prior Publication Data

US 2021/0138845 A1 May 13, 2021

(30) Foreign Application Priority Data

Apr. 25, 2018 (JP) ................................. 2018-084336

(51) Int. Cl.
*B60C 13/00* (2006.01)

(52) U.S. Cl.
CPC .................................. *B60C 13/001* (2013.01)

(58) Field of Classification Search
CPC ............................ B60C 13/001; B60C 13/003
See application file for complete search history.

(56) References Cited

U.S. PATENT DOCUMENTS 4,343,342 A * 8/1982 McDonald ............ B60C 13/001
D12/605
4,625,101 A * 11/1986 Hinks .............. G06K 19/06028
152/523

(Continued)

FOREIGN PATENT DOCUMENTS

CN 2709219 7/2005
EP 3 613 571 A1 2/2020

(Continued)

OTHER PUBLICATIONS

Point for Determining the Code Area. [online]. Denso Wave, Inc. Aug. 6, 2017. [retrieved on Nov. 4, 2022]. Retrieved from the Internet: <URL: https://web.archive.org/web/20170806111019/https://www.qrcode.com/en/howto/code.html>. (Year: 2017).*

(Continued)

*Primary Examiner* — Robert C Dye
(74) *Attorney, Agent, or Firm* — Thorpe North & Western

(57) ABSTRACT

A projecting pedestal is provided on a surface of a sidewall portion of a pneumatic tire. The projecting pedestal projects along the surface and includes a projecting front-end surface formed of a flat surface. A two-dimensional code is provided on the flat surface of the projecting pedestal. A normal line direction of the flat surface is inclined toward a rotation axis of the pneumatic tire at an angle ranging from 10 degrees to 45 degrees with respect to a tire lateral direction of the pneumatic tire, in the pneumatic tire not mounted on a rim nor inflated with air.

15 Claims, 2 Drawing Sheets

(56) References Cited

U.S. PATENT DOCUMENTS 5,301,728 A * 4/1994 Brown, Jr. ............ B60C 19/001 152/526
5,505,242 A * 4/1996 Narahara .................. B60C 3/04 152/555
6,250,352 B1 * 6/2001 Ishikawa ................... B60C 9/22 152/526
6,752,186 B1 * 6/2004 Ueyoko ................ B60C 15/024 152/554
2005/0211359 A1 * 9/2005 Yoshinaka ............ B60C 15/024 152/454
2006/0151451 A1 * 7/2006 Smith, Jr. .......... B29D 30/0061 219/121.68
2008/0283169 A1 * 11/2008 Sato ...................... B60C 13/001 152/450
2015/0310784 A1 10/2015 Evans
2016/0239734 A1 * 8/2016 Metz ..................... B60C 13/001
2017/0011666 A1 * 1/2017 Kraus ................... G09F 3/0297
2017/0050473 A1 2/2017 Muhlhoff et al.
2019/0291517 A1 * 9/2019 Nakajima ............... B60C 13/02
2020/0130310 A1 4/2020 Hatano

FOREIGN PATENT DOCUMENTS

JP S64-011824 1/1989
JP H07-266811 10/1995
JP 2005-164655 A 6/2005
JP 2007-045328 2/2007
JP 2017-516698 6/2017
WO WO 2005/000714 1/2005
WO WO 2015/164273 10/2015
WO WO 2015/165863 11/2015
WO WO-2015165862 A1 * 11/2015 ......... B29D 30/0606

OTHER PUBLICATIONS

English machine translation of WO-2015165862-A1. (Year: 2015).*
International Search Report for International Application No. PCT/JP2019/015720 dated Jul. 16, 2019, 4 pages, Japan.

* cited by examiner

PNEUMATIC TIRE

TECHNICAL FIELD

The present technology relates to a pneumatic tire and particularly relates to a pneumatic tire including a two-dimensional code engraved in a sidewall portion of the tire.

BACKGROUND ART

In recent years, a proposal has been made to provide a two-dimensional code, in which information is recorded, on a sidewall portion of a pneumatic tire (hereinafter also simply referred to as tire). The two-dimensional code can include more information than a one-dimensional code. Thus, various information can be included in the two-dimensional code for management of the tire. There has been a proposal that a pattern of predetermined dot holes be engraved in a sidewall portion to provide, on the sidewall portion, a two-dimensional code including a pattern of gray scale elements (International Patent Publication No. WO 2005/000714).

The two-dimensional code formed by engraving the pattern of predetermined dot holes in the sidewall portion is prevented from disappearing unless the sidewall portion is worn away, allowing the tire to be effectively managed.

For a pneumatic tire provided with such a two-dimensional code, even in a case where the pneumatic tire is mounted on the vehicle and used outdoors, the two-dimensional code is read so as to read out and utilize the information recorded in the two-dimensional code. "Read a two-dimensional code" refers to reading of the two-dimensional code using a two-dimensional reader, e.g., a mobile terminal. In this case, an attempt is made to read the two-dimensional code while the vehicle is stopped. However, the position on the tire circumference of the two-dimensional code on a stopped pneumatic tire as viewed from the road surface varies, and this also varies the manner in which the two-dimensional code is exposed to illumination light for illuminating the two-dimensional code. Thus, the two-dimensional code may be easy to read or difficult to read. In a case where reading is difficult, the vehicle needs to be moved to a position where the two-dimensional code is easy to read. In the pneumatic tire mounted on a vehicle as described above, the two-dimensional code often fails to be consistently stably read. In particular, in a case where the pneumatic tire mounted on a vehicle is used for a long period of time, the two-dimensional code is more frequently difficult to read depending on the position of the two-dimensional code on the tire circumference of the stopped pneumatic tire. This is because, in a case where the pneumatic tire mounted on a vehicle is used for a long period of time, cracks occur and develop in the dot holes in the two-dimensional code to form surface irregularities of the two-dimensional code. This prevents the gray scale elements of the two-dimensional code from being easily distinguished from one another unless illumination light with a sufficient light intensity is used.

SUMMARY

As described above, it is preferable to reduce the frequency at which the two-dimensional code provided on the pneumatic tire mounted on a vehicle is difficult to read, and it is also preferable that an increase in the frequency is small even in a case where the pneumatic tire is used for a long period of time. In other words, the two-dimensional code is preferably stably read not only in an initial use state of the pneumatic tire mounted on a vehicle but also in a long-term use state.

The present technology provides a pneumatic tire mounted on a vehicle and engraved with a two-dimensional code, the pneumatic tire enabling stable reading of the two-dimensional code and allowing stable reading of the two-dimensional code even during long-term use.

One aspect of the present technology is a pneumatic tire.

The pneumatic tire includes a projecting pedestal provided on a surface of a sidewall portion of the pneumatic tire, the projecting pedestal projecting along the surface and including a projecting front-end surface formed of a flat surface.

A two-dimensional code is provided on the flat surface of the projecting pedestal, the two-dimensional code formed of a dot pattern including two types of gray scale elements identifiably formed by surface irregularities, and in the pneumatic tire not mounted on a rim nor inflated with air, a normal line direction of the flat surface is inclined toward a rotation axis of the pneumatic tire at an angle ranging from 10 degrees to 45 degrees with respect to a tire lateral direction of the pneumatic tire.

Preferably, a ratio H1/H0 is from 0.3 to 0.8, as a length along a tire radial direction from an innermost position in the tire radial direction of a bead core of the pneumatic tire to a center position in the tire radial direction of the flat surface of the projecting pedestal is referred to as H1, and a height along the tire radial direction from the innermost position in the tire radial direction of the bead core to a maximum width position in the tire lateral direction of a curved surface of the sidewall portion is referred to as H0.

Preferably, the flat surface has a rectangular shape, and a ratio between two sides of the rectangular shape is from 0.8 to 1.2, in the pneumatic tire not mounted on a rim nor inflated with air.

Additionally, preferably, a ratio of an occupied area of the two-dimensional code to an area of the flat surface is from 40% to 90%.

Preferably, the projecting pedestal is provided at a position spaced from a projecting end of a rim protect bar and from a projecting end of a letter display portion projected with respect to the curved surface of the sidewall portion to display letters or symbols in white.

Preferably, for a projection height of the projecting pedestal, a ratio of a maximum projection height to a minimum projection height is 120% or less.

Preferably, a dark element of the dot pattern includes dot holes provided in the flat surface, and for the projection height of the projecting pedestal, a minimum projection height is larger than a hole depth dimension of each of the dot holes.

Preferably, the projecting pedestal provided with the two-dimensional code is provided at each of two opposing positions on a tire circumference with respect to a center of rotation of the tire.

Preferably, the projecting pedestal provided with the two-dimensional code is provided on each of sidewalls on both sides of the pneumatic tire in the tire lateral direction.

According to the pneumatic tire described above, even in a case where the pneumatic tire is mounted on a vehicle, the two-dimensional code can be stably read, and even in a case where the pneumatic tire is used for a long period of time, the two-dimensional code can be stably read.

DETAILED DESCRIPTION

A pneumatic tire according to one embodiment will be described in detail below.

In the present specification, "tire lateral direction" is the direction parallel with the rotation axis of the pneumatic tire. "Outward in the tire lateral direction" is the direction in the tire lateral direction away from a tire equator line CL (see FIG. 1) that represents a tire equatorial plane. "Inward in the tire lateral direction" is the direction in the tire lateral direction closer to the tire equator line CL. "Tire circumferential direction" is the direction in which the rotation axis of the pneumatic tire rotates as a center of rotation. "Tire radial direction" is the direction orthogonal to the rotation axis of the pneumatic tire. "Outward in the tire radial direction" refers to the direction away from the rotation axis. Similarly, "inward in the tire radial direction" refers to the direction closer to the rotation axis.

In the present specification, a two-dimensional code refers to a matrix display type code containing information in two directions, as opposed to a one-dimensional code (barcode) that contains information only in the lateral direction. Examples of two-dimensional codes include a QR Code® (trade name), a DataMatrix (trade name), a MaxiCode, a PDF-417 (trade name), a Code 16K (trade name), a 49 Code (trade name), an Aztec Code (trade name), an SP Code (trade name), a VeriCode® (trade name), and a CP Code (trade name).

Pneumatic Tire

Figure 1:
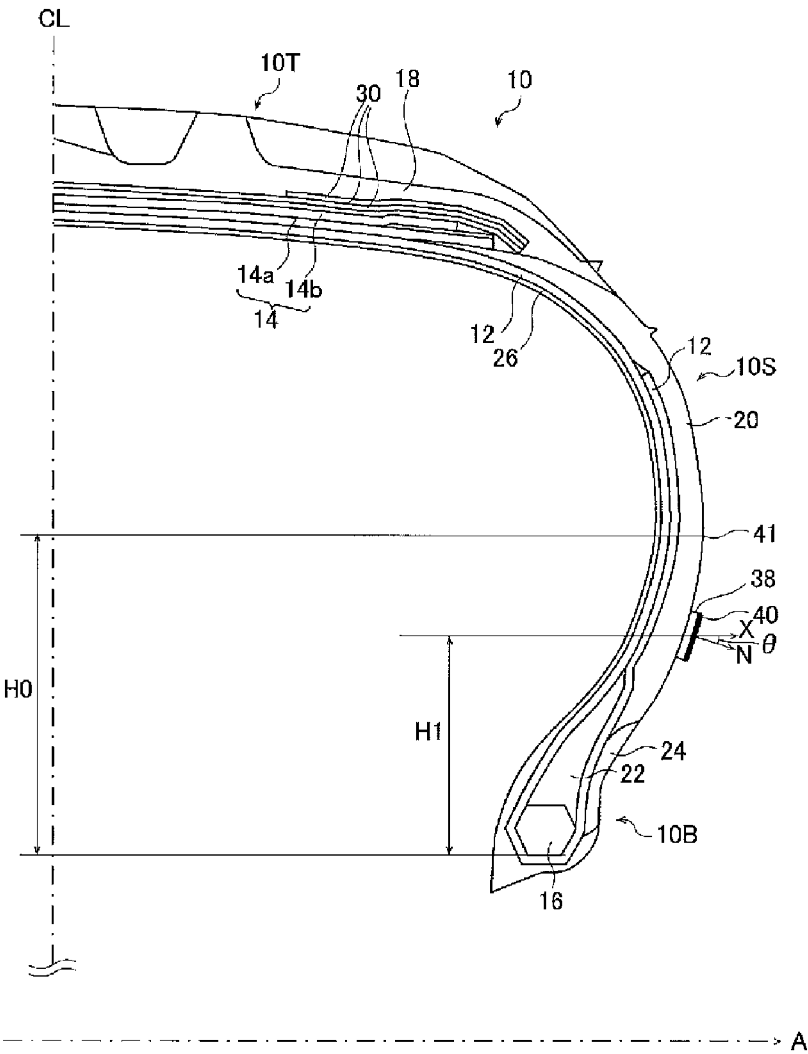
FIG. 1 is a diagram illustrating an exemplary configuration of a pneumatic tire according to one embodiment.

FIG. 1 is a diagram illustrating an exemplary configuration of a pneumatic tire 10 (hereinafter simply referred to as "tire 10") according to one embodiment. FIG. 1 illustrates a profile cross-section on one side of the tire equator line CL in the tire lateral direction.

The tire 10 includes a tread portion 10T including a tread pattern, a pair of bead portions 10B formed on both sides of the tire 10 in the tire lateral direction, and a pair of sidewall portions 10S provided on both sides of the tread portion 10T and respectively connecting each one of the pair of bead portions 10B and the tread portion 10T. The tread portion 10T is a portion that comes into contact with a road surface. The sidewall portions 10S are portions provided to sandwich the tread portion 10T from both sides of the tread portion 10T in the tire lateral direction. The bead portions 10B are portions connected to the sidewall portions 10S and located inward of the sidewall portions 10S in the tire radial direction.

The tire 10 primarily includes a carcass ply 12, a belt 14 and bead cores 16 as framework members, and a tread rubber 18, side rubbers 20, bead filler rubbers 22, rim cushion rubbers 24, and an innerliner rubber 26 disposed around the framework members.

The carcass ply 12 is formed of a carcass ply member that is made of organic fibers covered with rubber and wound between the pair of annular bead cores 16 into a toroidal shape. The carcass ply 12 is wound around the bead cores 16 and extends outward in the tire radial direction. The belt 14 is made up of two belt members 14*a* and 14*b*, and provided outward of the carcass ply 12 in the tire radial direction. The belt 14 is a member formed of steel cords covered with rubber. The steel cords are inclined at a predetermined angle, for example, from 20 to 30° with respect to the tire circumferential direction. The width of the lower belt member 14*a* in the tire lateral direction is greater than the width of the upper belt member 14*b* in the tire lateral direction. The steel cords of the two belt members 14*a* and 14*b* are inclined in opposite directions. As such, the belt members 14*a* and 14*b* are crossing layers serving to suppress expansion of the carcass ply 12 due to the pressure of the air in the tire.

The tread rubber 18 is disposed outward of the belt 14 in the tire radial direction. Both end portions of the tread rubber 18 connect to the side rubbers 20 to form the sidewall portions 10S. The rim cushion rubbers 24 are provided at the inward ends of the side rubbers 20 in the tire radial direction, and come into contact with the rim on which the tire 10 is mounted. The bead filler rubbers 22 are provided outward of the bead cores 16 in the tire radial direction so as to be interposed between a portion of the carcass ply 12 before the carcass ply 12 is wound around the bead cores 16 and a portion of the carcass ply 12 after the carcass ply 12 is wound around the bead cores 16. The bead filler rubber 22 extends outward from the bead core 16 in the tire radial direction along the carcass ply 12. The innerliner rubber 26 is provided on the inner surface of the tire 10 facing a tire cavity region that is filled with air and is surrounded by the tire 10 and the rim.

The tire 10 also includes a three-layered belt cover 30 formed of organic fibers covered with rubber between the belt member 14*b* and the tread rubber 18. The belt cover 30 covers the belt 14 from outward of the belt 14 in the tire radial direction. The belt cover 30 is not required and may be provided as needed. The number of layers that make up the belt cover 30 is not limited to three, and may be one or two layers.

A two-dimensional code 40 is formed on the surface of the sidewall portion 10S of the tire 10 configured as described above. In FIG. 1, the position of the two-dimensional code 40 is indicated by a thick line.

Sidewall Portion 10S and Two-Dimensional Code 40

Figure 2A:
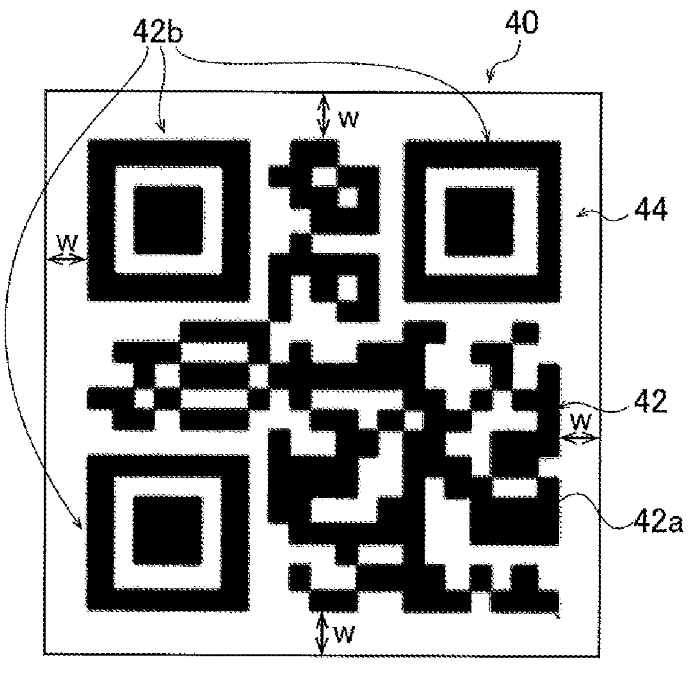
FIGS. 2A and 2B are diagrams illustrating an example of a two-dimensional code according to one embodiment.
Figure 2B:
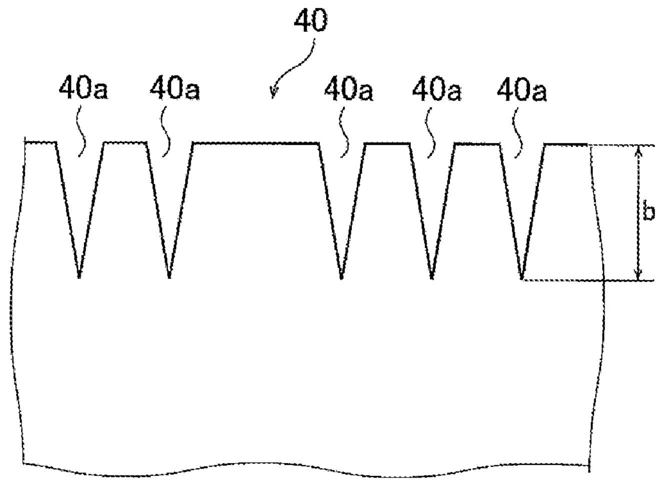

FIG. 2A is a diagram illustrating an example of the two-dimensional code 40 according to one embodiment provided on the surface of the sidewall portion 10S of the tire 10. FIG. 2B is a diagram illustrating an example of surface irregularities of the two-dimensional code 40.

The two-dimensional code 40 is engraved on the surface of the side rubber 20 in either of the sidewall portions 10S. The two-dimensional code 40 is formed of a dot pattern made up of two types of gray scale elements distinguishable from each other by surface irregularities. The two-dimensional code 40 is a pattern formed by converging laser beams on the surface of the sidewall portion 10S to concentrate energy and locally heat and burn the side rubber 20, thus engraving a plurality of small dot holes 40*a* in the surface. Each of the dot holes 40*a* is, for example, a conical hole, and has, on the tread surface, a diameter of, for example, from 0.1 to 1.0 mm and a hole depth b (see FIG. 2B) of, for example, from 0.3 to 1.0 mm.

The two-dimensional code 40 is formed by providing one dot hole (recess portion) in a dark unit cell region of a unit cell that defines the gray scale elements that make up the two-dimensional code. No dot holes (recess portions) are provided in a light unit cell region of the unit cell. In other words, the two-dimensional code 40 has a configuration in which the dot holes (recess portions) are arranged such that each dot hole (recess portion) forms one dark unit cell region among the gray scale elements in corresponding to a plurality of rectangular unit cell regions having the same size and divided into lattice-like shapes. In FIG. 2A, the dark region of the unit cell region is represented by a region colored in black.

The two-dimensional code 40 illustrated in FIG. 2A is a QR Code® (registered trademark) and includes a dot pattern region 42 in which a dot pattern includes two types of gray scale elements. A blank region 44 is provided around the dot pattern region 42. The blank region 44 is surrounded by light-colored elements of the gray scale elements and includes light-colored elements. (FIG. 2A illustrates frame lines to clarify outer edges of the blank region 44). A width w of the blank region 44 is preferably, for example, four to five times the dimension size of the unit cell region within the dot pattern region 42. For example, the blank region 44 is preferably from 15 to 25% the width of the dot pattern region 42.

Because the two-dimensional code 40 illustrated in FIG. 2A is a QR Code® (trade name), the dot pattern region 42 includes a data cell region 42*a* in which data cells of the QR Code® (trade name) are displayed, and position detection pattern regions 42*b* in which position detection patterns are displayed.

The two-dimensional code 40 described above is provided on a projecting pedestal 38 described below. Specifically, as illustrated in FIG. 1, the projecting pedestal 38 projects from the surface of the sidewall portion 10S along the surface. A projecting front-end surface of the projecting pedestal 38 is a flat surface. The projecting pedestal 38 extends a predetermined length in a band shape along the tire circumferential direction. Alternatively, the projecting pedestal 38 linearly extends a predetermined length on the tire circumference to form a rectangular shape.

The two-dimensional code 40 is provided on a flat surface of the projecting pedestal 38. Preferably, the projection height of the projecting pedestal 38 from a curved surface of the sidewall portion 10S is, for example, 1.0 to 3.0 mm, and the projection height from the curved surface is preferably substantially constant. "Substantially constant" means that, for the projection height, the ratio of the maximum projection height to the minimum projection height is 120% or less.

Furthermore, in the tire 10 not mounted on a rim nor inflated with air, a normal line direction N (see FIG. 1) of the flat surface of the projecting pedestal 38 is inclined toward a rotation axis AX of the tire 10 at an inclination angle θ ranging from 10 degrees to 45 degrees with respect to a tire lateral direction X of the tire 10 (see FIG. 1).

In a case where the projecting pedestal 38, in which the projecting front-end surface is a flat surface, is provided in an area curved to bulge and protrude outward in the tire lateral direction or curved inward in the tire lateral direction, the projection height from the curved area varies depending on the location on the tire. In this case as well, the projection height is preferably substantially constant as described above.

Here, in a case where the projection height does not have the substantially constant projection height described above, for example, in a case where the ratio of the maximum projection height to the minimum projection height is higher than 120%, a certain portion of the tire has a projection height exceeding a projection height necessary to provide the dot holes 40*a* in the two-dimensional code 40, and this portion is unnecessary. The unnecessary portion has a locally increased weight, reducing the uniformity and weight balance of the tire 10. In this regard, it is not preferable that the projection height not have the substantially constant projection height described above.

In a case where the two-dimensional code 40 provided on the tire 10 mounted on a vehicle is read, the two-dimensional code 40 is located at the foot of a reading operator. Thus, in a case where the surface provided with the two-dimensional code 40 faces parallel to the direction of the rotation axis AX (tire lateral direction), even in a case where the two-dimensional code reader is oriented toward the vicinity of the foot of the reading operator where the two-dimensional code 40 is present, the difference in level between the gray scale elements of the dot pattern of the two-dimensional code 40 is often not sufficient to enable reading because reflected light from the two-dimensional code 40 has a low light intensity. Thus, in a configuration in which the normal direction N of the flat surface of the projecting pedestal 38 is inclined toward the rotation axis AX of the tire 10 at an inclination angle θ=from 10 degrees to 45 degrees with respect to the tire lateral direction of the tire 10, the difference in level between the gray scale elements of the dot pattern increases to a degree enabling reading compared to a configuration in which the surface provided with the two-dimensional code 40 is a flat surface oriented in the tire lateral direction. Accordingly, compared to the configuration in which the surface provided with the two-dimensional code 40 is oriented in the tire lateral direction, the present embodiment allows reading of the two-dimensional code 40 to be improved. In a case where the normal direction of the flat surface of the projecting pedestal 38 is inclined toward the rotation axis AX of the tire 10 at an angle ranging from 10 degrees to 45 degrees with respect to the tire lateral direction of the tire 10 in the tire 10 as described above not mounted on a rim nor inflated with air, the normal direction of the flat surface of the projecting pedestal 38 can be inclined toward the rotation axis of the tire 10 at an angle ranging from 10 degrees to 45 degrees with respect to the tire lateral direction of the tire 10 even in the tire 10 mounted on a rim and inflated with air.

In other words, even in a case where the tire 10 is mounted on a vehicle, the two-dimensional code 40 can be stably read, and even in a case where the tire 10 is used for a long period of time, the two-dimensional code 40 can be stably read.

According to one embodiment, a ratio H1/H0 is preferably from 0.3 to 0.8, as a length along the tire radial direction from the innermost position in the tire radial direction of the bead core 16 of the tire 10 to the center position in the tire radial direction of the flat surface of the projecting pedestal 38 is referred to as H1 (see FIG. 1), and a height along the tire radial direction from the innermost position in the tire radial direction of the bead core 16 to a maximum width position 41 in the tire lateral direction of the curved surface of the sidewall portion 10S is referred to as H0 (see FIG. 1). Within this range, the projection height of the projecting pedestal 38 can be made substantially constant, and the normal line direction N of the flat surface of the projecting pedestal 38 can be set to an inclination angle θ=from 10 degrees to 45 degrees with respect to the tire lateral direction X. Additionally, by setting the ratio H1/H0 to from 0.3 to 0.8, the two-dimensional code 40 is prevented from being hidden by the rim flange, and the readability of the two-dimensional code 40 does not decrease. Additionally, the range in which the ratio H1/H0 is from 0.3 to 0.8 corresponds to an area where the two-dimensional code 40 is slightly deformed even in a case where the tire 10 rolls under a load and where cracks are unlikely to occur during long-term use of the tire 10. Thus, by setting the ratio H1/H0 at from 0.3 to 0.8, the readability of the two-dimensional code 40 is inhibited from decreasing even in a case where the tire 10 is used for a long period of time. The ratio H1/H0 is more preferably from 0.4 to 0.6.

According to one embodiment, preferably, the flat surface corresponding to the front-end surface of the projecting pedestal 38 has a rectangular shape, and the ratio between two sides (long side and short side) of the rectangular shape is from 0.8 to 1.2 in the pneumatic tire not mounted on a rim nor inflated with air. By forming the flat surface into the rectangular shape described above, the two-dimensional code 40 can be efficiently disposed, and unnecessary portions of the projecting pedestal 38 can be reduced. The rectangular flat surface of the projecting pedestal 38 is formed with a margin such that the blank region 44 illustrated in FIG. 2A is also located within the flat surface of the projecting pedestal 38. In addition, in a configuration where the unnecessary portions of the projecting pedestal 38 are reduced to increase the size of the two-dimensional code 40 for improved readability, the ratio of the occupied area of the two-dimensional code 40 to the area of the rectangular flat surface is preferably 40% to 90%.

In addition, according to one embodiment, the projecting pedestal 38 is preferably provided at a position spaced from a projecting end of a rim protect bar and from a projecting end of a white letter display portion. The white letter display portion is a letter display portion projected with respect to the curved surface of the sidewall portion 10S for displaying letters or symbols in white. The white letter display portion is formed by layering white rubber members shaped like letters or symbols and a black sheet member on the surface of the side rubber 20 of a green tire, forming the sidewall portion 10S, to obtain a partially projecting shape. Then, the green tire is vulcanized, and the black rubber at the projecting distal end of the above-described projecting shape of the tire obtained by the vulcanization is cut to expose the white rubber, causing white letters or symbols in the projecting shape to be displayed on the curved surface of the sidewall portion 10S. Additionally, the rim protect bar is provided in the vicinity of the rim flange and projects with respect to the curved surface of the sidewall portion 10S to protect the rim flange such that the rim protect bar comes into contact with a curb before coming into contact with the rim flange. In a case where the projecting pedestal 38 overlaps the projecting end of such a projecting portion, the two-dimensional code 40 is likely to create a shadow, making the two-dimensional code 40 difficult to read. Thus, the projecting pedestal 38 is preferably provided at a position spaced from the projecting end of the rim protect bar and from the projecting end of the white letter display portion.

The projecting end of the rim protect bar and the projecting end of the white letter display portion refer to portions with the maximum projection height, and in a case where the projecting ends are flat, refer to all of the flat portions.

In addition, according to one embodiment, for the projection height of the projecting pedestal 38, the minimum projection height is preferably larger than the dimension of the hole depth b of the dot hole 40*a*. A hole bottom of each dot hole 40*a* is located in the rubber portion of the projecting pedestal 38, and the dot hole 40*a* does not reach the side rubber 20. This is preferable in view of improved durability of the tire 10.

According to one embodiment, the projecting pedestal 38 provided with the two-dimensional code 40 is preferably provided at each of two opposing positions on the tire circumference with respect to the center of rotation of the tire. Providing the projecting pedestals 38 at the two opposing positions on the tire circumference means that, in a case where straight lines extending through the center of rotation of the tire from the respective positions of both ends in the tire circumferential direction of one of the projecting pedestals 38 are extended beyond the center of rotation of the tire, at least a part of the other projecting pedestal 38 is located in the region between the extensions of the two straight lines. Since the two-dimensional codes 40 are provided at the opposing positions on the tire circumference, one of the two two-dimensional codes 40 provided on the tire 10 mounted on a vehicle is located closer to the road surface as viewed from the center of rotation of the tire, and the flat surface of the projecting pedestal 38 provided with this two-dimensional code 40 more frequently faces the direction opposite to the road surface (upward direction). Thus, the two-dimensional code 40 can be easily read. Additionally, some vehicles are configured such that a portion of the tire above the center of rotation of the tire is covered by a fender of the vehicle. In such vehicles, only the two-dimensional code 40 located closer to the road surface as viewed from the center of rotation of the tire is exposed outward, and only this two-dimensional code 40 can be used for reading. For this reason, the projecting pedestal 38 is preferably provided at each of two opposing positions on the tire circumference with respect to the center of rotation of the tire.

The projecting pedestal 38 provided with the two-dimensional code 40 is preferably provided on each of the sidewall portions 10S on both sides of the tire 10 in the tire lateral direction. Even after the tire 10 is mounted on a vehicle, the two-dimensional code 40 engraved in the sidewall portion 10S on one side can be reliably read.

Examples, Conventional Example, and Comparative Examples

To confirm the effects of the embodiments described above, various tires 10 (tire size: 195/65R15 91H) were manufactured with the two-dimensional code 40 (specifically, a QR Code® (registered trademark)) disposed at different positions in the tire radial direction. The readability of the two-dimensional codes 40 was tested during long-term use of the tire 10. The tire configuration of each tire 10 is as illustrated in FIG. 1.

Each dot hole 40*a* of the two-dimensional code 40 had an inner diameter of 0.5 mm and a depth of 0.7 mm. The QR Code® (registered trademark) had a size of 15 mm×15 mm.

The average projection height of the projecting pedestal 38 was 1.0 mm.

The tire 10 was evaluated under two conditions including an initial condition (new tire) and a long-term use condition (initial readability and long-term use readability). To simulate long-term use of the tire 10, drum testing was conducted on each tire 10 on an indoor drum under predetermined conditions simulating long-term use. The drum testing is low-pressure testing based on FMVSS139 (rim size: 15×6 J, XL: 160 kPa, load: 100% LI). For the predetermined conditions simulating long-term use, specifically, the vehicle was driven 10000 km at a speed of 81 km/h, with the tire 10 irradiated with ozone at an ozone concentration of 100 pphm. After driving, a method of exposing the tire to illumination light was reproduced such that the two-dimensional code 40 was located at different positions on the tire circumference, for example, located closer to the road surface (lower side), opposite to the road surface (upper side), or on a side of the center of rotation of the tire, and whether the two-dimensional code 40 could be read was determined using a mobile terminal. For the initial reading, a method of exposing the tire to illumination light was reproduced such that the two-dimensional code 40 was located at different positions on the tire circumference, for example, located closer to the road surface (lower side) that comes into contact with the ground, opposite to the road surface (upper side), or on a side of the center of rotation of the tire, and whether the two-dimensional code 40 can be read was determined using a mobile terminal.

Five tires were prepared for each of the Examples, Conventional Example, and Comparative Examples (initial tire and long-term use tire), and the two-dimensional code 40 was read with the method of exposing the tire to illumination light varied. A reading rate was defined as the ratio of the number of correct readings to the number of readings of the two-dimensional code 40. The reading rate in Examples and Comparative Examples is expressed as an index value and evaluated, with the Conventional Example being assigned as a reference (the initial readability in the Conventional Example is assigned the index value of 100). Larger index values indicate a higher reading rate.

Table 1 below indicates results of the readability of the two-dimensional code 40 under the initial condition and the long-term use condition (initial readability and long-term use readability) for each specification of the projecting pedestal 38.

TABLE 1

| | Conventional Example | Comparative Example 1 | Comparative Example 2 | Comparative Example 3 |
|---|---|---|---|---|
| Presence of projecting pedestal 38 | No | Yes | Yes | Yes |
| Inclination angle θ | 30 degrees | 0 degrees | 5 degrees | 47 degrees |
| Initial readability | 100 | 95 | 102 | 103 |
| Long-term use readability | 84 | 80 | 85 | 98 |

| | Example 1 | Example 2 | Example 3 |
|---|---|---|---|
| Presence of projecting pedestal 38 | Yes | Yes | Yes |
| Inclination angle θ | 10 degrees | 30 degrees | 45 degrees |
| Initial readability | 105 | 107 | 105 |
| Long-term use readability | 102 | 101 | 100 |

All of Examples 1 to 3 exhibit higher readability under the initial condition and the long-term use condition than the Conventional Example and Comparative Examples 1 to 3. In other words, the table indicates that the readability under the initial condition and the long-term use condition is improved by providing the projecting pedestal 38 on the sidewall portion 10S and setting the inclination angle θ of the flat surface of the projecting pedestal 38 provided with the two-dimensional code 40 to from 10 to 45 degrees.

The foregoing has been a detailed description of the pneumatic tire according to embodiments of the present technology. However, the present technology is naturally not limited to the above embodiments and Examples, and may be improved or modified in various ways within the scope of the present technology.

The invention claimed is:

1. A pneumatic tire, comprising:

a projecting pedestal provided on a surface of a sidewall portion of the pneumatic tire, the projecting pedestal projecting along the surface and including a projecting front-end surface formed of a flat surface, the surface of the sidewall portion being a curved surface; and a two-dimensional code provided on the flat surface of the projecting pedestal, the two-dimensional code formed of a dot pattern including two types of gray scale elements identifiably formed by surface irregularities, and a normal line direction of the flat surface being inclined toward a rotation axis of the pneumatic tire at an angle ranging from 10 degrees to 45 degrees with respect to a tire lateral direction of the pneumatic tire, in the pneumatic tire not mounted on a rim nor inflated with air; wherein the dot pattern includes conical dot holes, the conical dot holes having a diameter of from 0.1 mm to 1.0 mm and a hole depth of from 0.3 mm to 1.0 mm and surfaces of the conical dot holes being defined by laser-burned rubber, and a ratio of a maximum projection height to a minimum projection height of the projecting pedestal is from 105% or more to 120% or less.

2. The pneumatic tire according to claim 1, wherein a ratio H1/H0 is from 0.3 to 0.8, as a length along a tire radial direction from an innermost position in the tire radial direction of a bead core of the pneumatic tire to a center position in the tire radial direction of the flat surface of the projecting pedestal is referred to as H1, and a height along the tire radial direction from the innermost position in the tire radial direction of the bead core to a maximum width position in the tire lateral direction of the curved surface of the sidewall portion is referred to as H0.

3. The pneumatic tire according to claim 2, wherein the flat surface has a rectangular shape, and a ratio between two sides of the rectangular shape is from 0.8 to 1.2, in the pneumatic tire not mounted on a rim nor inflated with air.

4. The pneumatic tire according to claim 3, wherein a ratio of an occupied area of the two-dimensional code to an area of the flat surface is from 40% to 90%.

5. The pneumatic tire according to claim 4, wherein the projecting pedestal is provided at a position spaced from a projecting end of a rim protect bar and from a projecting end of a letter display portion projected with respect to the curved surface of the sidewall portion to display letters or symbols in white.

6. The pneumatic tire according to claim 5, wherein, for a projection height of the projecting pedestal, a ratio of a maximum projection height to a minimum projection height is 120% or less.

7. The pneumatic tire according to claim 6, wherein a dark element of the dot pattern includes dot holes provided in the flat surface, and for the projection height of the projecting pedestal, the minimum projection height is larger than a hole depth dimension of each of the dot holes.

8. The pneumatic tire according to claim 7, wherein the projecting pedestal provided with the two-dimensional code is provided at each of two opposing positions on a tire circumference with respect to a center of rotation of the tire.

9. The pneumatic tire according to claim 8, wherein the projecting pedestal provided with the two-dimensional code is provided on each of sidewalls on both sides of the pneumatic tire in the tire lateral direction.

10. The pneumatic tire according to claim 1, wherein the flat surface has the rectangular shape, and a ratio between a first side of the rectangular shape and a second side of the rectangular shape is from 0.8 to 1.2, in the pneumatic tire not mounted on a rim nor inflated with air, the second side being perpendicular to the first side.

11. The pneumatic tire according to claim 10, wherein a ratio of an occupied area of the two-dimensional code to an area of the flat surface is from 40% to 90%.

12. The pneumatic tire according to claim 1, wherein the projecting pedestal is provided at a position spaced from a projecting end of a rim protect bar and from a projecting end of a letter display portion projected with respect to the curved surface of the sidewall portion to display letters or symbols in white.

13. The pneumatic tire according to claim 1, wherein a dark element of the dot pattern includes dot holes provided in the flat surface, and for a projection height of the projecting pedestal, a minimum projection height is larger than a hole depth dimension of each of the dot holes.

14. The pneumatic tire according to claim 1, wherein the projecting pedestal provided with the two-dimensional code is provided at each of two opposing positions on a tire circumference with respect to a center of rotation of the tire.

15. The pneumatic tire according to claim 1, wherein the projecting pedestal provided with the two-dimensional code is provided on each of sidewalls on both sides of the pneumatic tire in the tire lateral direction.

* * * * *